(12) United States Patent
Jenkins et al.

(10) Patent No.: US 10,288,147 B2
(45) Date of Patent: *May 14, 2019

(54) VEHICLE WHEEL BALANCE WEIGHTS

(71) Applicant: Plombco inc., Valleyfield (CA)

(72) Inventors: Ralph L. Jenkins, Scottsville, KY (US); Ross Everhard, Bowling Green, KY (US); Brian W. LaBorde, Lancaster, PA (US)

(73) Assignee: Plombco Inc., Valleyfield, Quebec (CA)

( * ) Notice: Subject to any disclaimer, the term of this patent is extended or adjusted under 35 U.S.C. 154(b) by 51 days.

This patent is subject to a terminal disclaimer.

(21) Appl. No.: 14/879,812

(22) Filed: Oct. 9, 2015

(65) Prior Publication Data

US 2016/0033007 A1 Feb. 4, 2016

Related U.S. Application Data

(63) Continuation of application No. 13/536,353, filed on Jun. 28, 2012, now Pat. No. 9,157,501, which is a (Continued)

(51) Int. Cl.
*F16F 15/32* (2006.01)
*B29C 45/14* (2006.01)
(Continued)

(52) U.S. Cl.
CPC ...... *F16F 15/324* (2013.01); *B29C 45/14221* (2013.01); *B29C 45/14475* (2013.01);
(Continued)

(58) Field of Classification Search
CPC ............ F16F 15/32; F16F 15/324; F16F 15/34
See application file for complete search history.

(56) References Cited

U.S. PATENT DOCUMENTS

| 1,889,577 A | 11/1932 | Tibbetts |
| 2,029,132 A | 1/1936 | Skelton |

(Continued)

FOREIGN PATENT DOCUMENTS

| CA | 2771580 | 9/2012 |
| DE | 3529513 | 2/1987 |

(Continued)

OTHER PUBLICATIONS

International Preliminary Report on Patentability, dated Sep. 10, 2013. Of Corresponding PCT Application No. PCT/CA2012/000210, filed on Mar. 8, 2012, filed by the applicant.
(Continued)

*Primary Examiner* — Jason R Bellinger
(74) *Attorney, Agent, or Firm* — Mathieu Audet

(57) ABSTRACT

A vehicle wheel weight for attachment to a wheel rim comprises a mass portion formed of nonlead material and a clip. The clip has an extended portion for engaging the wheel rim and an attachment portion juxtaposed to the mass portion. In addition, an injection molded outer casing surrounds the mass portion. The mass portion and the attachment portion of the clip are embedded in the casing, but the extended portion of the clip extends outwardly from and is external to the casing.

30 Claims, 16 Drawing Sheets

Related U.S. Application Data continuation of application No. 13/297,815, filed on Nov. 16, 2011, now abandoned, which is a continuation of application No. 12/817,957, filed on Jun. 17, 2010, now Pat. No. 8,066,335, which is a continuation of application No. 12/508,292, filed on Jul. 23, 2009, now abandoned, which is a continuation of application No. 11/324,784, filed on Jan. 3, 2006, now Pat. No. 7,566,101, which is a continuation-in-part of application No. 11/304,126, filed on Dec. 15, 2005, now Pat. No. 7,093,907, which is a continuation of application No. 10/724,000, filed on Nov. 26, 2003, now abandoned, which is a continuation-in-part of application No. 10/620,309, filed on Jul. 15, 2003, now abandoned.

(60) Provisional application No. 60/641,110, filed on Jan. 3, 2005, provisional application No. 60/396,075, filed on Jul. 15, 2002, provisional application No. 60/411,961, filed on Sep. 19, 2002.

(51) Int. Cl.
*F16F 15/34* (2006.01)
*B29L 31/30* (2006.01)

(52) U.S. Cl.
CPC .. *F16F 15/345* (2013.01); *B29C 2045/14868* (2013.01); *B29L 2031/3055* (2013.01); *Y10T 29/49* (2015.01); *Y10T 29/49492* (2015.01); *Y10T 29/49826* (2015.01)

(56) References Cited

U.S. PATENT DOCUMENTS

| | | |
|---|---|---|
| 2,049,703 A | 8/1936 | Hume |
| 2,061,463 A | 11/1936 | Hall |
| 2,122,065 A | 6/1938 | Hume |
| 2,137,415 A | 11/1938 | Rubsam |
| 2,221,747 A | 11/1940 | Turner |
| 2,336,920 A | 12/1943 | Beaman |
| 2,640,727 A | 6/1953 | Kennedy |
| 2,696,408 A | 12/1954 | Merriman |
| 3,008,768 A | 11/1961 | Kinsey |
| 3,011,828 A | 12/1961 | Karig |
| 3,495,877 A | 2/1970 | Möme |
| 3,669,500 A | 6/1972 | Ende |
| 3,688,380 A | 9/1972 | Hofmann |
| 3,786,850 A | 1/1974 | Turoczi, Jr. |
| 4,068,898 A | 1/1978 | Hanson |
| 4,300,803 A | 11/1981 | Chorosevic |
| 4,379,596 A | 4/1983 | Green |
| 5,228,754 A | 7/1993 | Rogers |
| 5,350,220 A | 9/1994 | Atwell, Jr. |
| 5,733,016 A | 3/1998 | Brown |
| 5,813,201 A | 9/1998 | Hsi-Chang |
| 5,959,205 A | 9/1999 | Yamaya |
| 6,238,005 B1 | 5/2001 | Sugayauchi |
| 6,238,006 B1 | 5/2001 | Manojlovic |
| 6,250,721 B1 | 6/2001 | Oba |
| 6,260,929 B1 | 7/2001 | Oba |
| 6,286,906 B1 | 9/2001 | Nagashima |
| 6,364,422 B1 | 4/2002 | Sakaki |
| 6,488,341 B2 | 12/2002 | Maruyama |
| 6,553,831 B1 | 4/2003 | Schmidt |
| 6,698,845 B2 | 3/2004 | Corte |
| 6,729,694 B2 | 5/2004 | Maruyama |
| 6,877,996 B1 | 4/2005 | Franks, Jr. |
| 6,948,781 B2 | 9/2005 | Sery |
| 7,055,914 B1 | 6/2006 | Jenkins |
| 7,093,907 B2 | 8/2006 | Jenkins |
| 7,216,938 B2 | 5/2007 | Phillips |
| 7,249,804 B2 | 7/2007 | Zank |
| 7,354,968 B2 | 4/2008 | Nishikawa |
| 7,497,356 B2 | 3/2009 | Beranger |
| 7,566,101 B2 | 7/2009 | Jenkins |
| 7,818,868 B2 | 10/2010 | Chancharoen |
| 7,841,669 B2 | 11/2010 | Zank |
| 7,883,156 B2 | 2/2011 | Pursley |
| 8,066,335 B2 | 11/2011 | Jenkins |
| 9,157,501 B2 * | 10/2015 | Jenkins ................ F16F 15/324 |
| 2003/0067208 A1 | 4/2003 | Maruyama |
| 2003/0127906 A1 | 7/2003 | Yamaguchi |
| 2004/0007912 A1 | 1/2004 | Amyot |
| 2004/0256909 A1 | 12/2004 | Sery |
| 2005/0104439 A1 | 5/2005 | Phillips |
| 2006/0119166 A1 | 6/2006 | Jenkins |
| 2006/0119167 A1 | 6/2006 | Jenkins |
| 2006/0138854 A1 | 6/2006 | Le Moal |
| 2007/0120414 A1 | 5/2007 | Jenkins |
| 2007/0251078 A1 | 11/2007 | Chancharoen |
| 2008/0042486 A1 | 2/2008 | Malbos |
| 2009/0230757 A1 | 9/2009 | Chancharoen |
| 2009/0243370 A1 | 10/2009 | Peniche |
| 2009/0278397 A1 | 11/2009 | Jenkins |
| 2010/0007194 A1 | 1/2010 | Zank |
| 2010/0007195 A1 | 1/2010 | Pursley |
| 2010/0007196 A1 | 1/2010 | Astorino |
| 2011/0266862 A1 | 11/2011 | Halle |
| 2012/0062018 A1 | 3/2012 | Jenkins |
| 2012/0062019 A1 | 3/2012 | Jenkins |
| 2012/0228920 A1 | 9/2012 | Lussier |
| 2012/0267941 A1 | 10/2012 | Everhard |

FOREIGN PATENT DOCUMENTS

| | | |
|---|---|---|
| EP | 1165328 | 10/2000 |
| EP | 1302695 | 4/2003 |
| EP | 1857707 | 11/2007 |
| EP | 1927784 | 6/2008 |
| FR | 2878957 | 6/2006 |
| JP | 4317521 | 7/1948 |
| JP | 5316201 | 2/1978 |
| JP | 53045801 | 4/1978 |
| JP | 58081803 | 5/1983 |
| JP | 60061301 | 4/1985 |
| JP | 60061302 | 4/1985 |
| JP | 61033301 | 2/1986 |
| JP | 63291702 | 11/1988 |
| JP | 1148602 | 6/1989 |
| JP | 3139401 | 6/1991 |
| JP | 3272347 | 12/1991 |
| JP | 4203639 | 7/1992 |
| JP | U1994063957 | 9/1994 |
| JP | Y1994049951 | 12/1994 |
| JP | U1995008646 | 2/1995 |
| JP | 8061433 | 3/1996 |
| JP | 3046046 | 11/1997 |
| JP | U0003046046 | 11/1997 |
| JP | 10026187 | 1/1998 |
| JP | 2779484 | 5/1998 |
| JP | 3051017 | 5/1998 |
| JP | U0003051017 | 5/1998 |
| JP | 10176732 | 6/1998 |
| JP | 305876 | 8/1998 |
| JP | 10220532 | 8/1998 |
| JP | U0003053876 | 8/1998 |
| JP | 10331918 | 12/1998 |
| JP | 11013834 | 1/1999 |
| JP | 11166595 | 1/1999 |
| JP | 3057630 | 3/1999 |
| JP | U0003057629 | 3/1999 |
| JP | U0003057630 | 3/1999 |
| JP | Y0002596562 | 4/1999 |
| JP | 2933098 | 5/1999 |
| JP | 11201235 | 7/1999 |
| JP | U0003062277 | 7/1999 |
| JP | 3066654 | 8/1999 |
| JP | 11210835 | 8/1999 |
| JP | 11210836 | 8/1999 |
| JP | U0003063301 | 8/1999 |
| JP | 11257435 | 9/1999 |
| JP | 11279415 | 10/1999 |

(56) References Cited

FOREIGN PATENT DOCUMENTS

| | | |
|---|---|---|
| JP | 11280845 | 10/1999 |
| JP | 11294541 | 10/1999 |
| JP | U0003065011 | 10/1999 |
| JP | U0003066654 | 12/1999 |
| JP | 2000035087 | 2/2000 |
| JP | 2000046120 | 2/2000 |
| JP | 3065526 | 5/2000 |
| JP | 20000145894 | 5/2000 |
| JP | 2000314453 | 11/2000 |
| JP | 2001012554 | 1/2001 |
| JP | 2001041290 | 2/2001 |
| JP | 2001080886 | 3/2001 |
| JP | 2001099234 | 4/2001 |
| JP | 2001132797 | 5/2001 |
| JP | 200122759 | 8/2001 |
| JP | 2001221289 | 8/2001 |
| JP | 2001221290 | 8/2001 |
| JP | 2001227590 | 8/2001 |
| JP | 2001234980 | 8/2001 |
| JP | 2001280423 | 10/2001 |
| JP | 2001343048 | 12/2001 |
| JP | 2002054686 | 2/2002 |
| JP | 2002061713 | 2/2002 |
| JP | 2002061714 | 2/2002 |
| JP | 2002098194 | 4/2002 |
| JP | 2002174299 | 6/2002 |
| JP | 3333914 | 8/2002 |
| JP | 2002257197 | 9/2002 |
| JP | 2002286097 | 10/2002 |
| JP | 2003113900 | 4/2003 |
| JP | 3503007 | 12/2003 |
| JP | 2004084715 | 3/2004 |
| JP | 2004092685 | 3/2004 |
| JP | 3569663 | 6/2004 |
| JP | 3663066 | 4/2005 |
| JP | 3677912 | 5/2005 |
| JP | U0003112148 | 6/2005 |
| JP | 2005291262 | 10/2005 |
| JP | 3772942 | 2/2006 |
| JP | 3783134 | 3/2006 |
| JP | 2006131027 | 5/2006 |
| JP | 2006153079 | 6/2006 |
| JP | 2006175910 | 7/2006 |
| JP | 3847974 | 9/2006 |
| JP | 3893478 | 12/2006 |
| JP | 3897905 | 1/2007 |
| JP | 3909404 | 2/2007 |
| JP | 3918012 | 2/2007 |
| JP | 3918013 | 2/2007 |
| JP | 3922666 | 3/2007 |
| JP | 2007162860 | 6/2007 |
| JP | 2008049842 | 3/2008 |
| JP | 2008057649 | 3/2008 |
| JP | 4119334 | 5/2008 |
| JP | 4149900 | 7/2008 |
| JP | 4394009 | 10/2009 |
| JP | U0003160651 | 6/2010 |
| JP | 4680729 | 2/2011 |
| JP | 2011052779 | 3/2011 |
| JP | 2011094735 | 5/2011 |
| WO | WO9955924 | 11/1999 |
| WO | WO0061391 | 10/2000 |
| WO | WO02086347 | 10/2002 |
| WO | WO04025139 | 3/2004 |
| WO | WO2007114690 | 10/2007 |
| WO | WO2008107667 | 9/2008 |
| WO | WO2011128654 | 10/2011 |

OTHER PUBLICATIONS

International Search Report, dated Jul. 3, 2012, of Corresponding PCT application No. PCT/CA2012/000210, filed Mar. 8, 2012, filed by the applicant.

\* cited by examiner

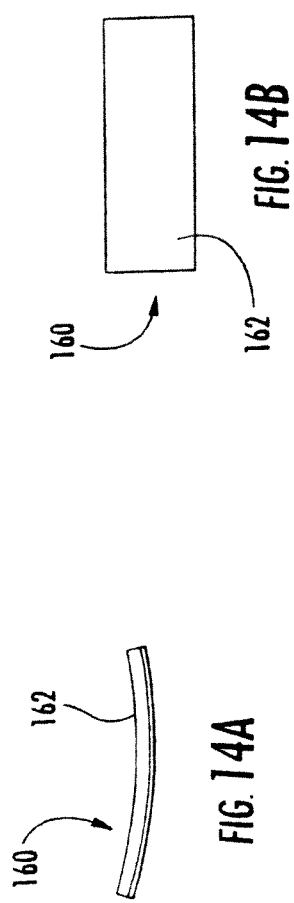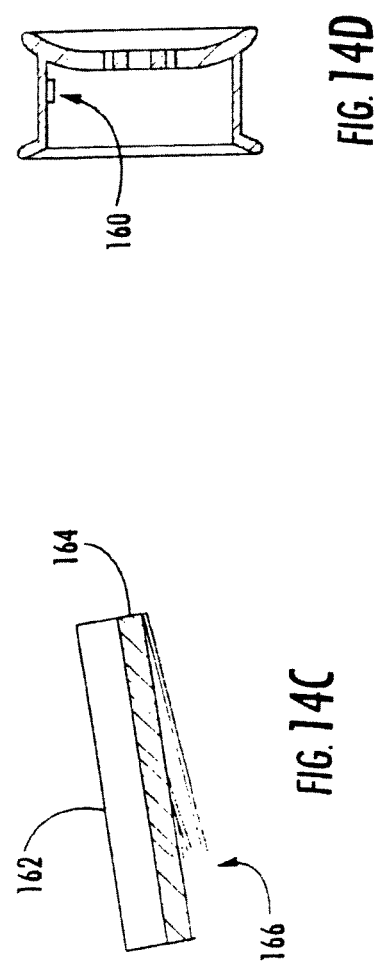

VEHICLE WHEEL BALANCE WEIGHTS

PRIORITY CLAIM

This application is a continuation of application Ser. No. 13/536,353, filed Jun. 28, 2012, now U.S. Pat. No. 9,157,501 which is a continuation of application Ser. No. 13/297,815, filed Nov. 16, 2011, now abandoned, which is a continuation of application Ser. No. 12/817,957, filed Jun. 17, 2010, now U.S. Pat. No. 8,066,335, which is a continuation of application Ser. No. 12/508,292, filed Jul. 23, 2009, which is a continuation of application Ser. No. 11/324,784 ("the '784 application"), filed Jan. 3, 2006, now U.S. Pat. No. 7,566,101, which claims the benefit of provisional application Ser. No. 60/641,110, filed Jan. 3, 2005. The '784 application is also a continuation-in-part of application Ser. No. 11/304,126, filed Dec. 15, 2005, now U.S. Pat. No. 7,093,907, which is a continuation of application Ser. No. 10/724,000, filed Nov. 26, 2003, which is a continuation-in-part of application Ser. No. 10/620,309, filed Jul. 15, 2003, which claims the benefit of provisional application Ser. No. 60/411,961, filed Sep. 19, 2002. Each of the above-referenced applications, to which priority is claimed, is relied upon and incorporated herein by reference.

BACKGROUND OF THE INVENTION

The present invention relates to wheel balance weights.

In order to reduce excessive vibration, vehicle wheels are often balanced by placing weights at selected locations. The weights include a mass portion which is attached to the wheel's rim using a spring clip or a suitable adhesive. Due to high mass and low cost, such weights have been made of lead. Because of various factors, however, it is becoming desirable to manufacture such weights of materials other than lead.

SUMMARY OF THE INVENTION

The present invention provides a variety of configurations for a vehicle wheel weight. Preferred embodiments utilize iron or low carbon steel for mass instead of lead as has generally been used in the past. Many embodiments are attached to the wheel using a spring clip preferably made of spring steel. In such embodiments, a groove may be formed in the center section of the mass with a width that matches the spring clip as required to achieve the desired fit during assembly. Depth of the groove may match the spring clip thickness or be slightly greater.

According to one aspect, the present invention provides a vehicle wheel weight for attachment to a wheel rim which comprises a mass portion formed of nonlead material and a clip. The clip has an extended portion for engaging the wheel rim and an attachment portion juxtaposed to the mass portion. In addition, an outer casing (or sleeve) which could be formed of injection molded plastic surrounds the mass portion. The mass portion and the attachment portion of the clip are embedded in the casing, but the extended portion of the clip extends outwardly from and is external to the casing.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 14A is a side elevational view of a further tape-on weight constructed in accordance with the present invention;

FIG. 14B is a plan view of the wheel weight of FIG. 14A;

FIG. 14C is an enlarged end view of the wheel weight of FIG. 14A;

FIG. 14D shows a vehicle wheel in section, with the wheel weight of FIG. 14A mounted thereto;

Figure 1A:
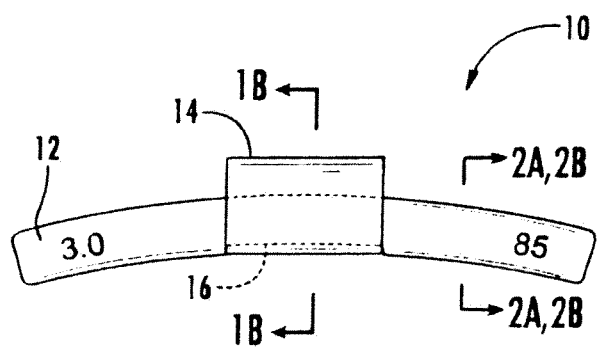
FIG. 1A is a front elevational view of a vehicle wheel weight constructed in accordance with a first embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1B:
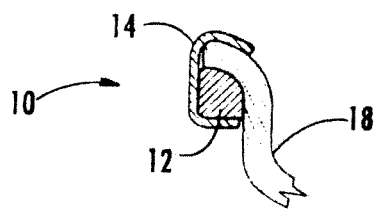
FIG. 1B is a cross sectional view taken along line 1B-1B of FIG. 1A showing the wheel weight further mounted to the rim of a wheel.
Figure 1C:
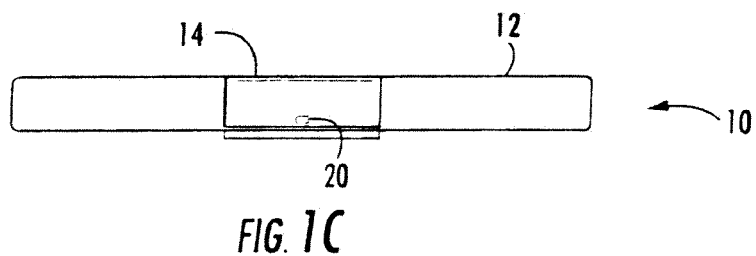
FIG. 1C is a bottom view of the wheel weight of FIG. 1A.

FIGS. 1A through 1C illustrate a vehicle wheel weight 10 constructed in accordance with a first embodiment of the present invention. As shown, wheel weight 10 includes a mass portion 12 to which a spring clip 14 is attached. As shown, clip 14 (which may be made from spring steel) is located in a groove 16 which has a depth preferably equal to or slightly greater than the thickness of clip 14. As can be seen in FIG. 1B, clip 14 serves to attach weight 10 to the rim 18 of a vehicle wheel.

As shown, clip 14 is preferably configured as a C-shaped member such that it "wraps around" mass portion 12 on the side opposite to rim 18. Clip 14 is retained in this case by one or more spot welds (such as spot weld 20) at suitable locations. For example, the spot weld may be made at the point on the clip most distant from the wheel rim flange. This is to prevent tempering of the spring steel of clip 14 near the location where the wheel rim is to be engaged.

Figure 2A:
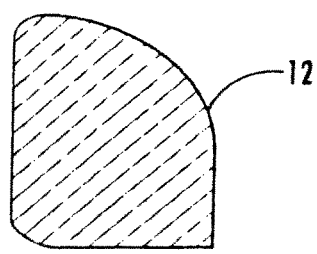
FIG. 2A is a cross sectional view of the mass portion of a vehicle wheel weight in accordance with the present invention made solely of a nonlead material such as iron or low carbon steel.
Figure 2B:
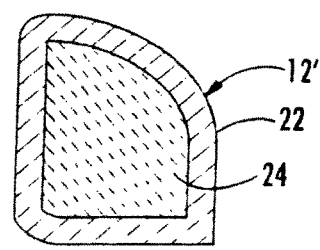
FIG. 2B is a cross sectional view similar to FIG. 2A but showing a mass portion made of an outer sheath of nonlead material with lead on the inside.
Figure 3A:
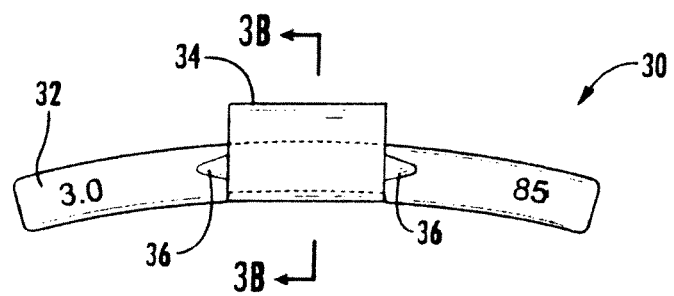
FIG. 3A is a front elevational view of a vehicle wheel weight constructed in accordance with a second embodiment of the present invention before material for retaining the clip is swaged into place.
Figure 3B:
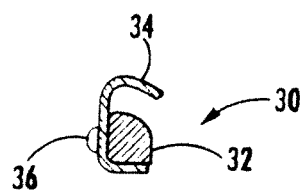
FIG. 3B is a cross sectional view taken along line 3B-3B of FIG. 3A.
Figure 3C:
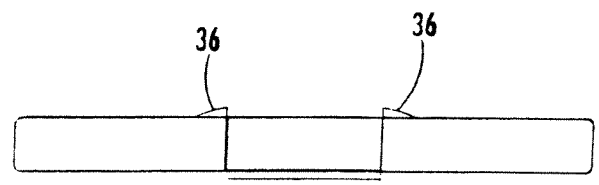
FIG. 3C is a bottom view of the wheel weight of FIG. 3A.
Figure 3D:
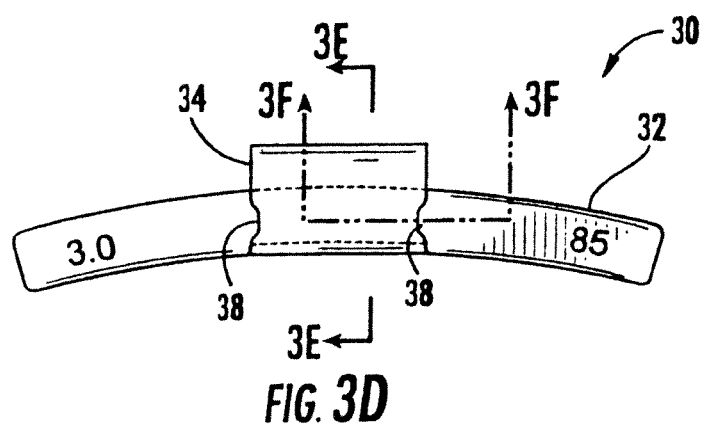
FIG. 3D is a view similar to FIG. 3A but with the retaining material swaged into place.
Figure 3E:
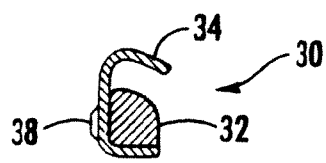
FIG. 3E is a cross sectional view taken along line 3E-3E of FIG. 3D.
Figure 3F:
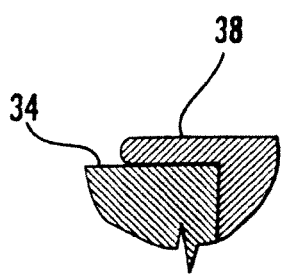
FIG. 3F is an enlarged cross sectional taken along line 3F-3F of FIG. 3D.

Mass portion 12 is preferably made from a nonlead material having suitable mass, such as iron, low carbon steel or an impregnated polymeric. (See U.S. Pat. No. 6,364,422 to Sakaki et al., incorporated herein by reference.) In FIG. 2A, mass portion 12 is preferably made entirely of iron or low carbon steel. Often, a 1008 steel will be especially preferred. FIG. 2B illustrates an alternative mass portion 12' in which an outer sheath 22 of nonlead metal is filled with lead 24. In this way the lead component is encased within a skin of steel or other suitable rugged material.

FIGS. 3A through 3F illustrate a wheel weight 30 constructed in accordance with another embodiment of the present invention. As shown, weight 30 includes a mass portion 32 and a spring clip 34. In this case, clip 34 is attached via raised portions 36 (FIGS. 3A-3C) of mass material located at the sides of the groove in which clip 34 is seated. Raised portions 36 are then swaged over top of clip 34 (as indicated at 38 in FIGS. 3D-3F) to cause an interference fit with the clip.

Figure 4A:
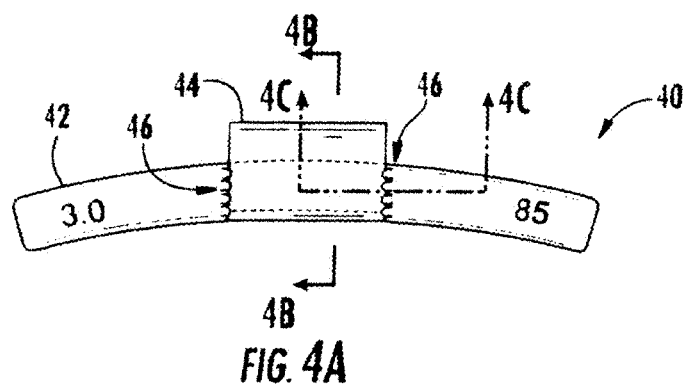
FIG. 4A is a front elevational view of a vehicle wheel weight constructed in accordance with a third embodiment of the present invention.
Figure 4B:
FIG. 4B is a cross sectional view taken along line 4B-4B of FIG. 4A.
Figure 4C:
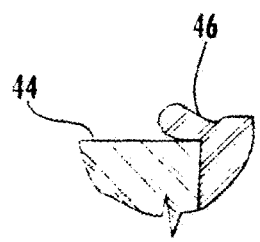
FIG. 4C is an enlarged cross sectional taken along line 4C-4C of FIG. 4A.

FIGS. 4A through 4C illustrate a wheel weight 40 constructed in accordance with a further embodiment of the present invention. Weight 40 includes a mass portion 42 defining a groove into which a spring clip 44 is seated. Unlike the embodiment of FIGS. 3A-3F, this embodiment does not utilize a raised area beside the groove. Instead, the sides of the groove are swaged into the clip at points with a staking technique (as indicated at 46) to give a "stitched look."

Figure 5A:
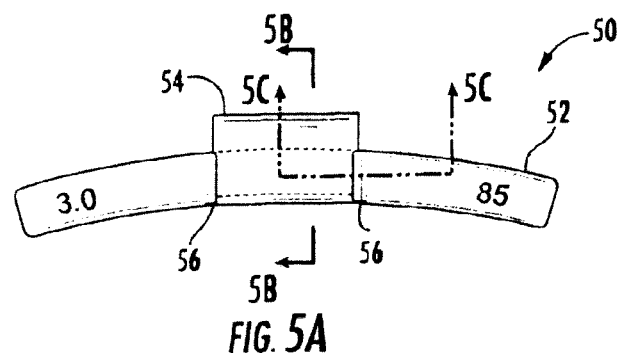
FIG. 5A is a front elevational view of a vehicle wheel weight constructed in accordance with a fourth embodiment of the present invention.
Figure 5B:
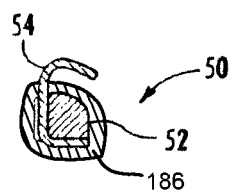
FIG. 5B is a cross sectional view taken along line 5B-5B of FIG. 5A.
Figure 5C:
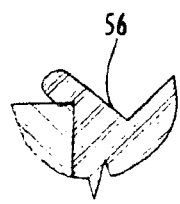
FIG. 5C is an enlarged cross sectional taken along line 5C-5C of FIG. 5A.

A further embodiment of a wheel weight 50 constructed in accordance with the present invention is illustrated in FIGS. 5A through 5C. Weight 50 includes a mass portion 52 defining a groove into which a spring clip 54 is seated. As indicated at 56, the sides of the groove are swaged into the clip as described above except that a forming tool having a "wedge" shape is used to cause the top of the groove to close. In particular, the forming tool is pressed against the mass portion at respective locations adjacent to and outside of the sidewalls of the groove. The resulting swage lines are clearly shown.

Figure 6A:
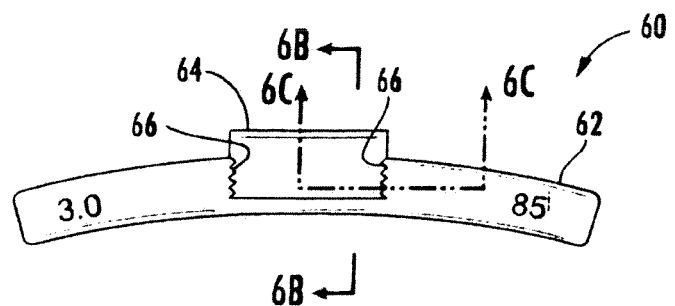
FIG. 6A is a front elevational view of a vehicle wheel weight constructed in accordance with a fifth embodiment of the present invention.
Figure 6B:
FIG. 6B is a cross sectional view taken along line 6B-6B of FIG. 6A.
Figure 6C:
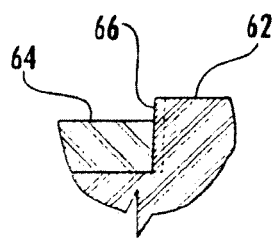
FIG. 6C is an enlarged cross sectional taken along line 6C-6C of FIG. 6A.

Referring now to FIGS. 6A through 6C, a wheel weight 60 constructed in accordance with a further embodiment of the present invention is illustrated. Weight 60 includes a mass portion 62 defining a groove into which a spring clip 64 is seated. In this case, the spring clip 64 may be approximately L-shaped (rather than C-shaped as in previous embodiments). As indicated at 66, an interference fit is created by providing the clip with serrated edges which are pressed into a groove having a width slightly less than the clip width. In this embodiment, it may be optionally desirable to also perform some swaging of material to further secure the interference fit.

Figure 7A:
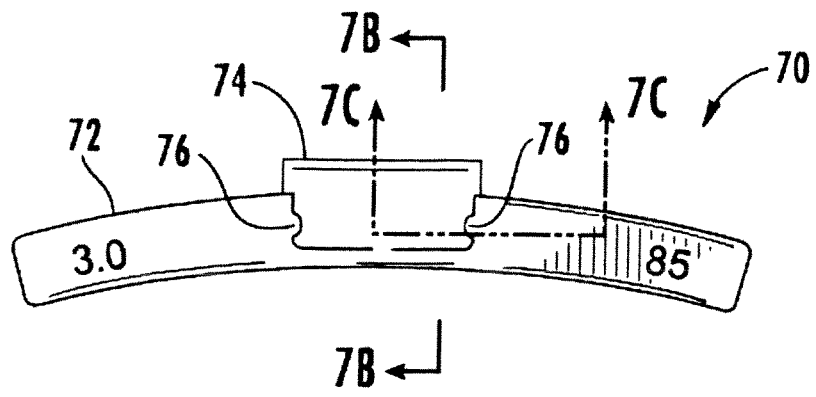
FIG. 7A is a front elevational view of a vehicle wheel weight constructed in accordance with a sixth embodiment of the present invention.
Figure 7B:
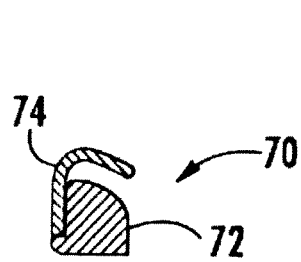
FIG. 7B is a cross sectional view taken along line 7B-7B of FIG. 7A.
Figure 7C:
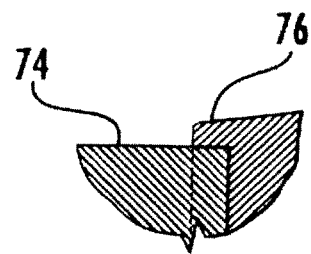
FIG. 7C is an enlarged cross sectional view taken along line 7C-7C of FIG. 7A.
Figure 7D:
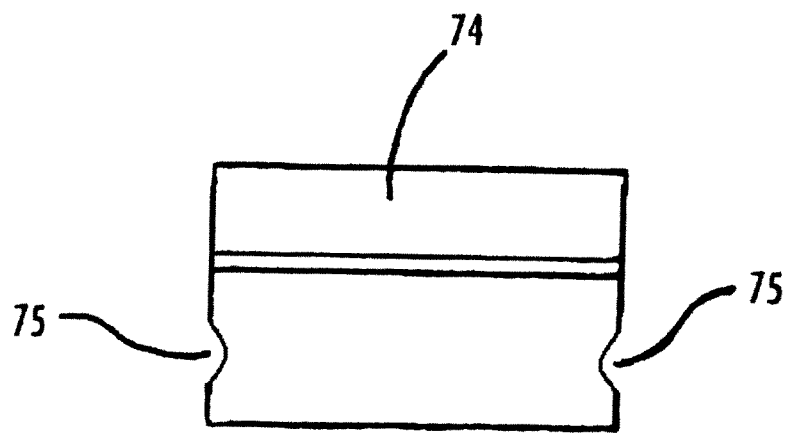
FIG. 7D is an enlarged view of the clip shown in FIGS. 7A-7C.

FIGS. 7A through 7D illustrate a wheel weight 70 constructed in accordance with a further embodiment of the present invention. Weight 70 includes a mass portion 72 defining a groove into which an L-shaped spring clip 74 is seated. Sidewalls of the groove are thus adjacent to side edges of the attachment portion of the clip. To secure the two components, at least one lateral feature is located at each of the side edges of the clip's attachment portion. In this case, for example, the lateral feature may be in the form of an indention 75 defined in each side of the clip. As shown in FIG. 7D, indention 75 may preferably have an arcuate shape, such as a ⅓ circle, and be spaced from the bottom edge of the clip. As indicated at 76, the groove is swaged enough to force metal along the side edges of the attachment portion such that it will move into the indention, as well as over portions of the top of the clip. For example, a "wedge" forming tool may be used as described above with reference to FIGS. 5A through 5C. As a result, the clip will be fixedly secured to the mass portion.

Figure 8A:
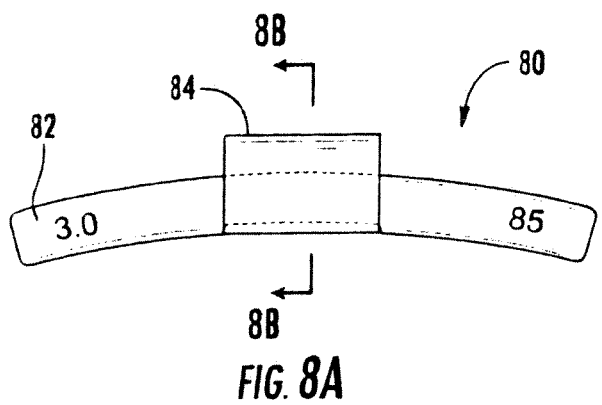
FIG. 8A is a front elevational view of a vehicle wheel weight constructed in accordance with a seventh embodiment of the present invention.
Figure 8B:
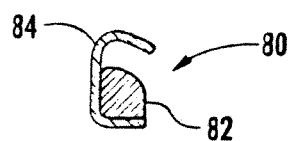
FIG. 8B is a cross sectional view taken along line 8B-8B of FIG. 8A.
Figure 8C:
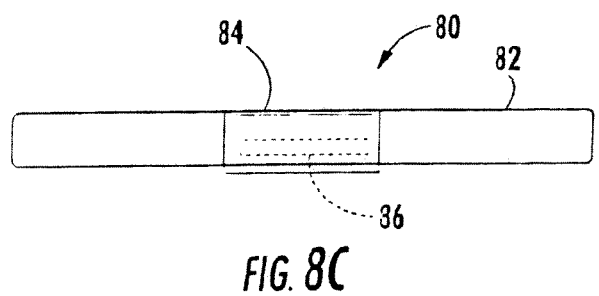
FIG. 8C is a bottom view of the wheel weight of FIG. 8A.

FIGS. 8A through 8C illustrate a further embodiment in which a wheel weight 80 is constructed in accordance with the present invention. It can be seen that weight 80 is similar to weight 10, except the mass portion 82 and spring clip 84 are joined with a suitable adhesive (as indicated at 86) instead of spot welding. Although a strip of structural adhesive as shown in the drawing may often be sufficient, in many cases it will be desirable to apply the adhesive liberally over the mating surfaces.

Figure 9:
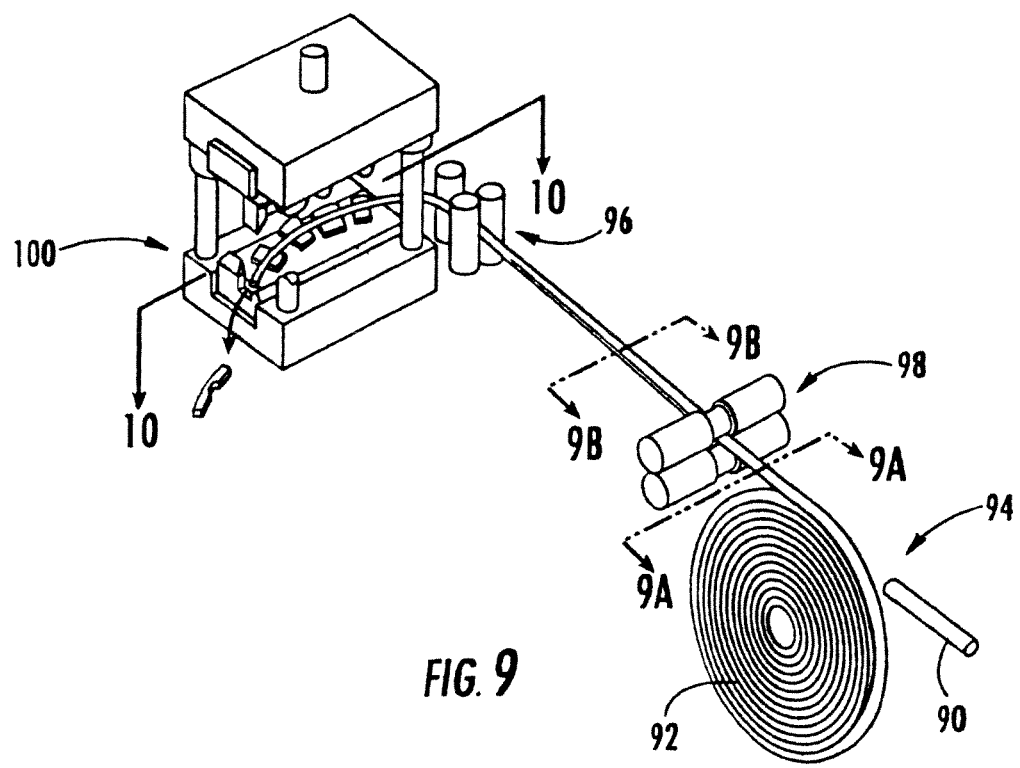
FIG. 9 is a perspective view diagrammatically illustrating one technique for producing the mass portion of nonlead wheel weights in accordance with the present invention.
Figure 9A:
FIGS. 9A and 9B are cross-sectional views of the mass material at the locations indicated by lines 9A-9A and 9B-9B, respectively.
Figure 9B:
Figure 10:
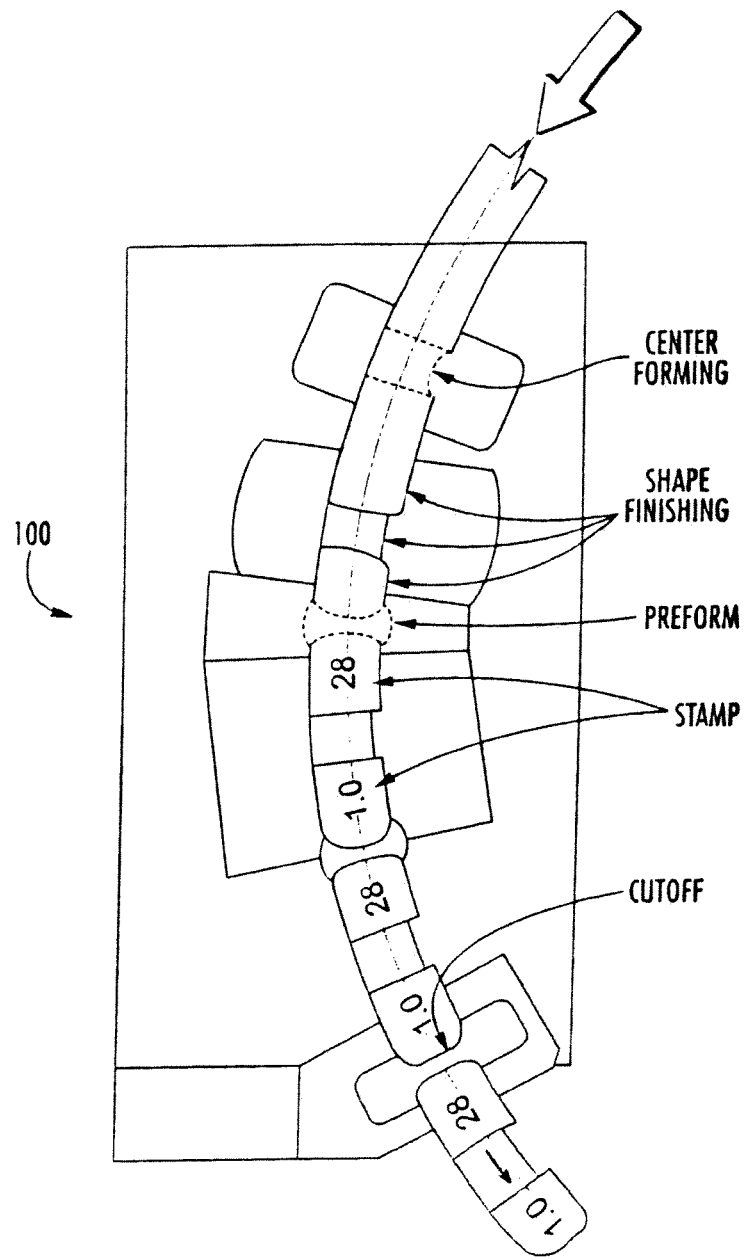
FIG. 10 is a plan view diagrammatically illustrating the steps that take place at the forming station indicated by line 10-10 of FIG. 9.

Referring now to FIGS. 9 and 10, one method of producing the mass portion from iron or low carbon steel will be described. This method utilizes raw material that is either round in cross-section or preformed with a shape that is either the same as or is substantially similar to the cross-section of the mass portion to be formed (such as round for a wheel balance weight). One "piece" of raw material would contain enough material for numerous wheel weight masses. This may be either a long rod 90 or a coil 92 with enough material for hundreds or thousands of finished mass portions.

In this case, the mass forming machinery comprises three subsystems working together. These may be described as follows:

1. Material handling and supply 94—Either an "uncoiler" or rod feeding equipment is provided to deliver the raw material (e.g., iron).

2. Forming rolls 96 and 98 (or other suitable rolling machine) are provided to form the long (wheel size) radius and pre-form the shape that will fit into the rim flange. The amount of pre-forming would be inversely proportional to the size of press being used.

3. A metal forming press 100 is used to finish the rim flange shape, form a groove for the wheel balance weight clip, stamp product information into the surface, and cut to the required length. The press working surfaces would be a die that may be progressive or not depending on press size and part details. A large press forming a large part may be able to form all surfaces and cut to length in one stroke. Alternatively, small parts may need to be made in a progressive fashion to get all forming surfaces to bear on a small area. A small press could form a large part by using a progressive die and distributing the work over more than one press cycle.

As an alternative to the details shown in FIG. 10, it may be desirable in some cases to form the cut-off "Preform" prior to "Shape Finishing." In fact some of the die operations might be done before the die. The die could then be a stamping/trim die.

Finally, suitable corrosion protection materials may be applied after assembling the mass and clip. Other finishing may or may not be required depending on customer finishing requirements.

Figure 11A:
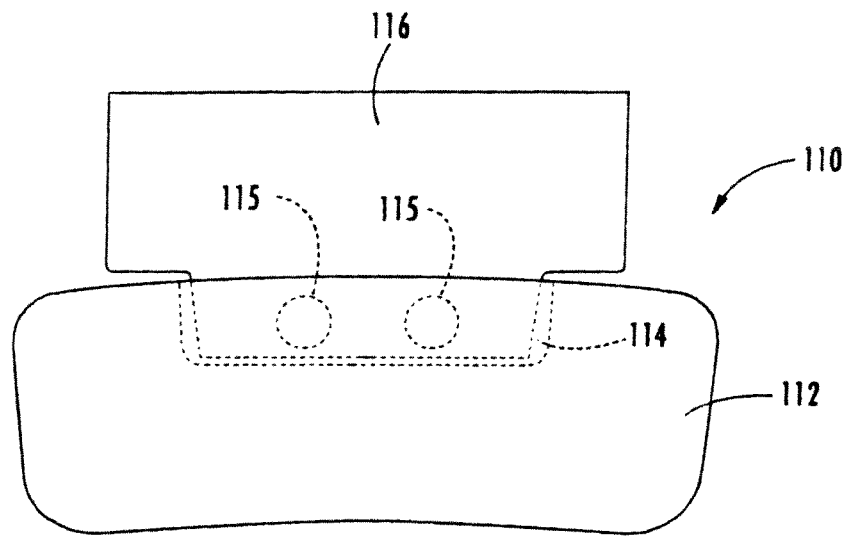
FIGS. 11A and 11B illustrate an eighth embodiment of a vehicle wheel weight constructed in accordance with the present invention.
Figure 11B:
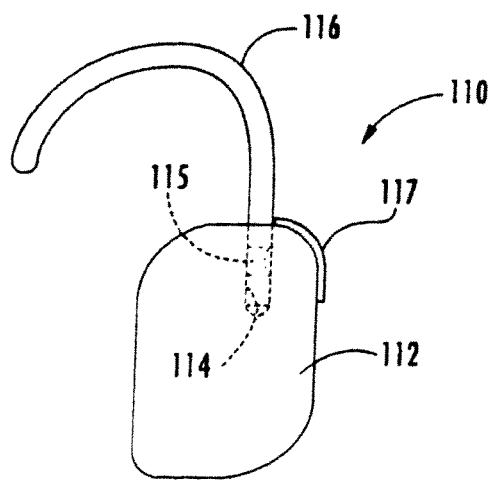

FIGS. 11A and 11B illustrate a further embodiment of a wheel weight 110 constructed in accordance with the present invention. Weight 110 includes a mass portion 112 defining a cavity 114 in which spring clip 116 is inserted. Specifically, mass portion 112 may be cold formed with cavity 114 form fitted inside the body of the weight. This will eliminate the need for having the clip extend over either the front or back of the clip. Preferably, the attachment portion of the spring clip includes at least one surface irregularity, here in the form of a pair of holes 115, to facilitate retention of the attachment portion therein. When the securement cavity is closed after insertion of the attachment portion of the spring clip, a small hump 117 remains due to the thickness of the clip.

FIGS. 12A-12D illustrate an alternative embodiment in which the weights may be attached to the wheel rim using an adhesive coating (i.e., a tape-on weight). Preferably, the mass portions are formed as a flexible string of nonlead mass material having a predetermined number of segments. A covering (i.e., a release liner) which protects the adhesive is removed when it is desired to attached the mass portion(s) to the wheel. The illustrated embodiment has several significant features, including: (1) deep grooves formed into its surface to make the string conformable to different size wheels, and (2) a unique pull tab arrangement.

As can be seen, tape-on weight 120 includes a mass portion formed as a strip 122 of suitable nonlead material. Strip 122 is divided into a plurality of segments 124 defined by respective grooves 126. Groove 126 is formed as deep as possible, while leaving a small uncut zone 128 at the bottom. Zone 128 permits the string to be flexed so as to conform to the arc of the rim to which it is to be attached. Each of the segments 124 will preferably have a predetermined weight, such as 5 grams.

Figure 12B:
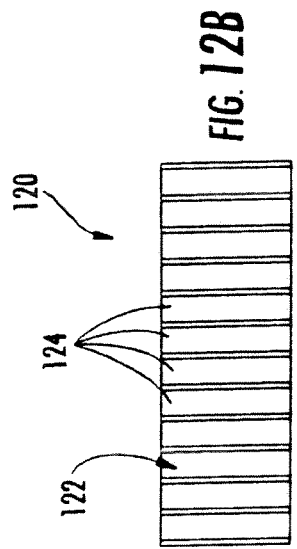
FIG. 12B is a plan view of the wheel weight of FIG. 12A.
Figure 12D:
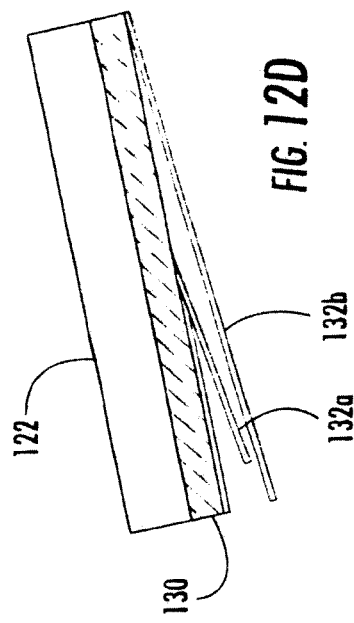
FIG. 12D is an enlarged end view of the wheel weight of FIG. 12A.
Figure 12A:
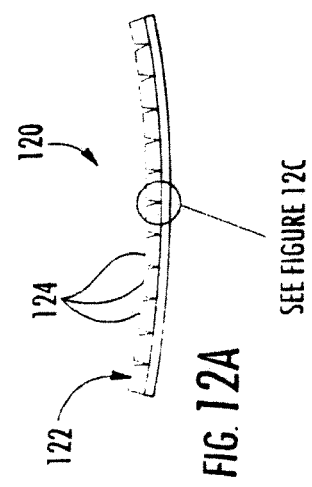
FIG. 12A is a side elevational view of a tape-on version of a vehicle wheel weight constructed in accordance with the present invention.
Figure 12C:
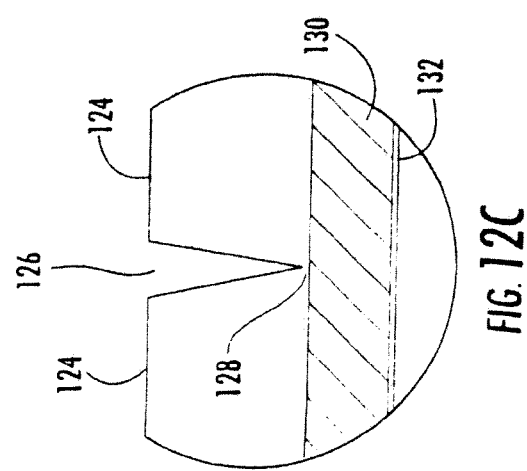
FIG. 12C is an enlarged view of the portion so indicated in FIG. 12A.

In this embodiment, the adhesive is provided in the form of a two-sided tape 130 attached to the bottom surface of string 122. Preferably, tape 130 will include a conformable carrier of foam or the like having adhesive on each side. A release liner 132 is located on the back side of tape 130 so as to cover the adhesive until use. As illustrated in FIG. 12D, the release liner may actually be formed as two pieces of tape 132A and 132B configured to provide pull tabs for easy removal. In this case, liner portion 132a is folded back on itself as shown in FIG. 12D.

Figure 13:
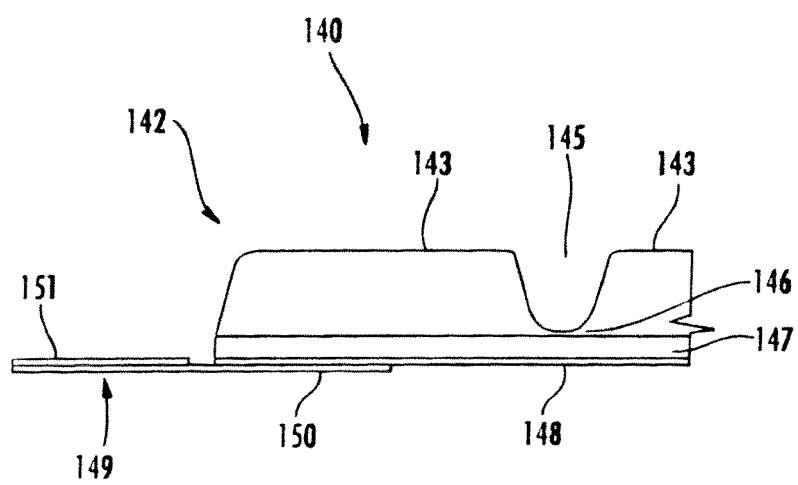
FIG. 13 is an enlarged fragmentary view of an alternative tape-weight constructed in accordance with the present invention.

FIG. 13 illustrates an alternative embodiment of a tape weight 140 constructed in accordance with the present invention. Weight 140 includes a mass portion formed as a strip 142 of weight segments 143 defined by transverse grooves 145. Groove 145 is configured to leave a small uncut zone 146 near the bottom of strip 142. A double-sided tape 147 is located on the back side of strip 142. A release liner 148 is provided behind double-sided tape 147 so as to protect the adhesive.

A small tab 149 connected to (or integral with) release liner 148 extends from the longitudinal end of strip 142 so as to facilitate removal of release liner 148. In this case, tab 149 is formed as a separate piece of tape which overlaps the end of release liner 148 (as indicated at 150) and overlaps itself (as indicated at 151). Silicone tapes are believed to be particularly suitable for tab 149.

Generally, weight 140 will be sold in a variety of different numbers of segments depending upon the total weight to be achieved. For example, a typical construction may have two to six segments of 5 grams each. As a result, total weight will fall in a range of 10-60 grams. Larger weight sizes may also be desirable in certain applications.

Preferably, zone 146 will be as thin as possible in order to provide for greatest flexibility. For example, embodiments are contemplated in which the thickness of zone 146 is about three thousandths of an inch. Generally, the thickness would not exceed twenty thousandths in presently preferred embodiments.

It is also desirable that the width of groove 145 be substantial so as to prevent surface treatment bridging which adds stiffness to the overall weight. Specifically, the weight may be subjected to a variety of surface treatments in order to reduce corrosion and the like. For example, zinc plating (or zinc phosphate wash) followed by epoxy powder and painting may be employed. Making groove 145 of sufficient width will prevent these surface treatments from adding significant stiffness to the overall weight. In presently preferred embodiments, the width of groove 145 will typically be at least fifty thousandths of an inch at its widest point (the mouth). Often, widths of around 130 thousandths will be preferred.

Referring now to FIGS. 14A-14D, a further embodiment of a tape-on weight constructed in accordance with the invention is illustrated. As can be seen, tape-on weight 160 is made of non-lead material, such as iron or low carbon steel. The mass portion 162 of weight 160 is preformed in an arc having a radius approximating that of the surface to which it is to be mounted. Dimensions (such as length) of the wheel weight are determined based on the desired mass. In addition, the weight must not be made of a size (e.g., thickness and width) such that it would interfere with the operation of other vehicle parts.

An adhesive (here in the form of a double-sided tape 164) is located on the outer diameter of mass portion 162. Although mass portion 162 will generally be rigid, the presence of the adhesive will provide a degree of elasticity (conformability) to accommodate varying wheel diameters. The adhesive is protected prior to use using a release liner 166, which is in this example similar to release liner 132 (FIG. 12D).

Figure 15A:
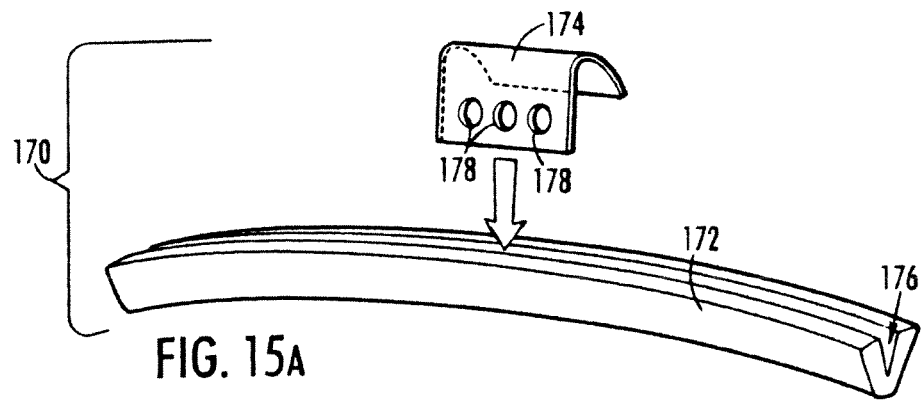
FIG. 15A an exploded view of a vehicle wheel weight constructed according to another embodiment of the present invention.
Figure 15B:
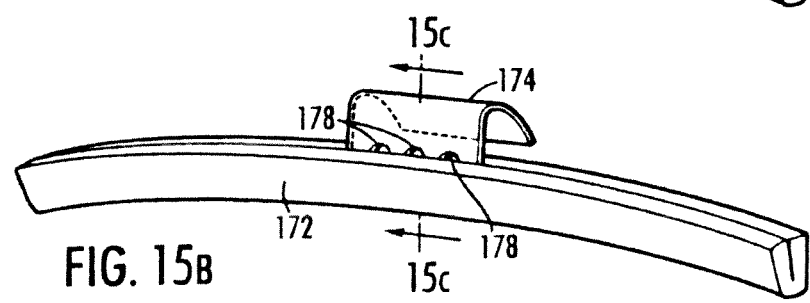
FIG. 15B is a perspective view of the vehicle wheel weight of FIG. 15A.
Figure 15C:
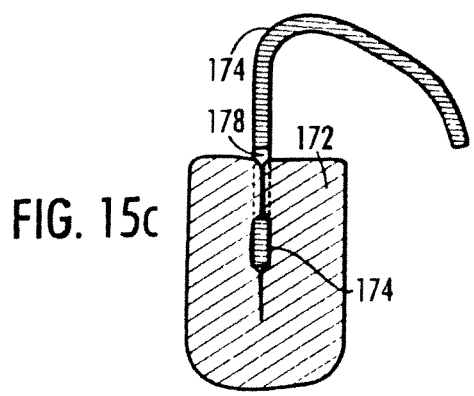
FIG. 15C is a side cross sectional view taken along line 15C-15C of FIG. 15B.

FIGS. 15A through 15C illustrate a wheel weight 170 constructed in accordance with another embodiment of the present invention. As shown, weight 170 includes a mass portion 172 and a spring clip 174. In this case, a longitudinal slot 176 is defined in mass portion 172 to receive the end portion of clip 174. For example, mass portion 172 could be formed with a "V" shaped cross section. It should be appreciated that multiple mass portions could be formed by cutting an elongated piece having a slot into multiple segments.

Clip 174 is inserted into slot 176 of mass portion 172. To fix the position of clip 174 in slot 176, mass portion 172 is crimped together to cause an interference fit, thereby embedding clip 174 into mass portion 172. Preferably, clip 174 has surface irregularities 178, such as a hole, groove or indentation, to which mass portion 172 can grip to aid in fixing the position of clip 174. As shown in FIG. 15C, for example, mass portion 172 deforms into surface irregularities 178 of clip 174 during crimping.

Figure 16B:
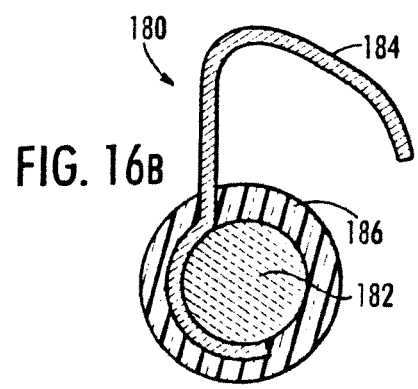
FIG. 16B is a side cross sectional view taken along line 16B-16B of FIG. 16A.
Figure 16A:
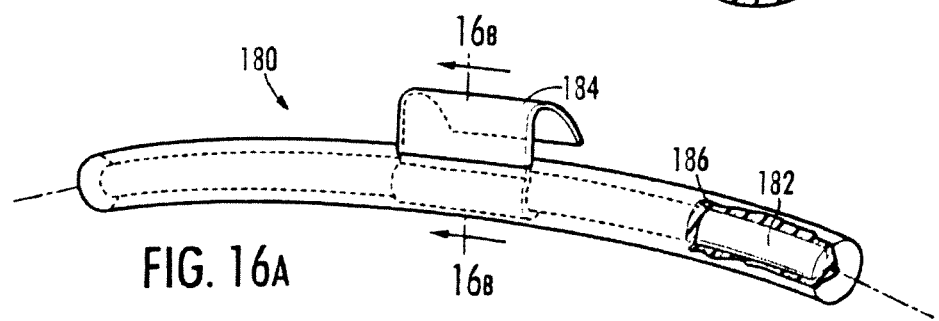
FIG. 16A is a perspective view of a vehicle wheel weight having a partially cut-away portion to show mass portion constructed according to another embodiment of the present invention.

FIGS. 16A and 16B illustrate a wheel weight 180 constructed in accordance with another embodiment of the present invention. As shown, weight 180 includes a mass portion 182 and a spring clip 184. In this case, a protective sleeve 186 surrounds mass portion 182 and fixes the position of clip 184. For example, sleeve 186 could be injection-molded plastic. Prior to injection molding, clip 184 and mass portion 182 could be loosely arranged together. However, the injection molding fixes the position of clip 184 so that it can not move. Moreover, mass portion 182 is protected from the environment by sleeve 186 to prevent corrosion.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A vehicle wheel weight for attachment to a wheel rim, said wheel weight comprising:
    (a) a mass portion formed of nonlead material;
    (b) a clip having an extended portion for engaging said wheel rim between a first clip extremity, located at a distal end of the extended portion, and an intermediate portion, and an attachment portion juxtaposed to said mass portion between a clip second extremity, located at a distal end of the attachment portion, and the intermediate portion;
    (c) an injection molded outer casing surrounding said mass portion, with said mass portion and said attachment portion of said clip being embedded in said casing, but with said extended portion of said clip extending outwardly from and being external to said casing;
    (d) wherein said attachment portion continuously contacts the mass portion between the clip second extremity and the intermediate portion; and
    (e) wherein the attachment portion is generally extending over one half of the mass portion.

2. A vehicle wheel weight as set forth in claim 1, wherein said mass portion includes a first side, constituting an inboard face, for facing said wheel rim and an opposite second side, constituting an outboard face, said attachment portion being secured to said second side.

3. A vehicle wheel weight as set forth in claim 1, wherein said attachment portion of said clip is affixed to said mass portion with a semi-circular shape.

4. A vehicle wheel weight as set forth in claim 3, wherein the semi-circular shape has a constant radius.

5. A vehicle wheel weight as set forth in claim 1, wherein an interior surface of said casing conforms to an exterior configuration of said mass portion and of said attachment portion of the clip on the mass portion as together embedded in the casing, but an exterior surface of said casing conforms to a shape of a mold in which it is formed.

6. A wheel weight as set forth in claim 5, wherein the exterior surface of the casing is of generally uniform cross-sectional shape along the length of the wheel weight.

7. A vehicle wheel weight as set forth in claim 1, wherein said nonlead material comprises iron.

8. A vehicle wheel weight as set forth in claim 1, wherein said nonlead material comprises low carbon steel.

9. A vehicle wheel weight as set forth in claim 1, wherein said nonlead material comprises 1008 steel.

10. A vehicle wheel weight as set forth in claim 1, wherein said mass portion is cold formed.

11. A vehicle wheel weight as set forth in claim 1, wherein said mass portion has an arcuate shape.

12. A method of manufacturing a vehicle wheel weight for engaging a rim of a wheel for use in balancing the wheel, said method comprising:
    (a) providing a mass portion formed of nonlead material;
    (b) providing a clip having an extended portion for engaging said wheel rim and an attachment portion;
    (c) positioning said attachment portion of said clip at a selected location adjacent to said mass portion;
    (d) encasing said mass portion and said attachment portion of said clip with injection molded plastic such that said mass portion and said attachment portion of said clip are embedded in a plastic outer casing but said extended portion of said clip is not embedded in said plastic outer casing;

(e) wherein said attachment portion continuously contacts the mass portion between a clip second extremity and an intermediate portion; and (f) wherein the attachment portion is generally extending over one half of the mass portion.

13. A method as set forth in claim 12, wherein an inside of said casing conforms to the mass portion and the attachment portion of the clip on the mass portion as together embedded in the casing, but an external surface of said casing conforms to a shape of a mold in which it is formed.

14. A method as set forth in claim 13, wherein the exterior surface of the casing is of generally uniform cross-sectional shape along the length of the wheel weight.

15. A method as set forth in claim 12, wherein said nonlead material comprises iron.

16. A method as set forth in claim 12, wherein said nonlead material comprises low carbon steel.

17. A method as set forth in claim 12, wherein said nonlead material comprises 1008 steel.

18. A method as set forth in claim 12, wherein said mass portion is cold formed.

19. A method as set forth in claim 12, wherein said mass portion has an arcuate shape.

20. A vehicle wheel with a vehicle wheel weight attachment thereon, said vehicle wheel comprising:

(a) a wheel rim;

the wheel weight comprising:

(a) a mass portion formed of nonlead material;

(b) a clip having an extended portion for engaging said wheel rim between a first clip extremity, located at a distal end of the extended portion, and an intermediate portion, and an attachment portion juxtaposed to said mass portion between a clip second extremity, located at a distal end of the attachment portion, and the intermediate portion;

(c) an injection molded outer casing surrounding said mass portion, with said mass portion and said attachment portion of said clip being embedded in said casing, but with said extended portion of said clip extending outwardly from and being external to said casing;

(d) wherein said attachment portion continuously contacts the mass portion between the clip second extremity and the intermediate portion; and (e) wherein the attachment portion is generally extending over one half of the mass portion.

21. A vehicle wheel as set forth in claim 20, wherein said mass portion includes a first side, constituting an inboard face, for facing said wheel rim and an opposite second side, constituting an outboard face, said attachment portion being secured to said second side.

22. A vehicle wheel as set forth in claim 20, wherein said attachment portion of said clip is affixed to said mass portion with a semi-circular shape.

23. A vehicle wheel as set forth in claim 22, wherein the semi-circular shape has a constant radius.

24. A vehicle wheel as set forth in claim 20, wherein an interior surface of said casing conforms to an exterior configuration of said mass portion and of said attachment portion of the clip on the mass portion as together embedded in the casing, but an exterior surface of said casing conforms to a shape of a mold in which it is formed.

25. A vehicle wheel as set forth in claim 24, wherein the exterior surface of the casing is of generally uniform cross-sectional shape along the length of the wheel weight.

26. A vehicle wheel as set forth in claim 20, wherein said nonlead material comprises iron.

27. A vehicle wheel as set forth in claim 20, wherein said nonlead material comprises low carbon steel.

28. A vehicle wheel as set forth in claim 20, wherein said nonlead material comprises 1008 steel.

29. A vehicle wheel as set forth in claim 20, wherein said mass portion is cold formed.

30. A vehicle wheel as set forth in claim 20, wherein said mass portion has an arcuate shape.

* * * * *